(12) United States Patent
Shibayama et al.

(10) Patent No.: US 11,366,498 B2
(45) Date of Patent: Jun. 21, 2022

(54) PORTABLE INFORMATION DEVICE HAVING CHASSIS ROTATABLY CONNECTED BY A HINGE

(71) Applicant: LENOVO (SINGAPORE) PTE. LTD., Singapore (SG)

(72) Inventors: Yoshiyuki Shibayama, Kanagawa (JP); Kazuyuki Kubota, Kanagawa (JP); Fusanobu Nakamura, Kanagawa (JP); Atsushi Nagashima, Kanagawa (JP)

(73) Assignee: LENOVO (SIGAPORE) PTE LTD, Singapore (SG)

( * ) Notice: Subject to any disclaimer, the term of this patent is extended or adjusted under 35 U.S.C. 154(b) by 0 days.

(21) Appl. No.: 17/161,959

(22) Filed: Jan. 29, 2021

(65) Prior Publication Data

US 2021/0232183 A1 Jul. 29, 2021

(30) Foreign Application Priority Data

Jan. 29, 2020 (JP) ................ JP2020-12484

(51) Int. Cl.
*G06F 1/16* (2006.01)
(52) U.S. Cl.
CPC .......... *G06F 1/1681* (2013.01); *G06F 1/1616* (2013.01); *G06F 1/1647* (2013.01)
(58) Field of Classification Search
CPC ..... G06F 1/1681; G06F 1/1616; G06F 1/1647
USPC .................................................. 361/679.27
See application file for complete search history.

(56) References Cited

U.S. PATENT DOCUMENTS

| 2016/0201367 | A1* | 7/2016 | Kato ...................... E05D 3/122 361/679.09 |
| 2019/0364682 | A1* | 11/2019 | Kikuchi ................ E05D 7/0009 |
| 2020/0192437 | A1* | 6/2020 | Lin ...................... H04M 1/0216 |
| 2021/0064084 | A1* | 3/2021 | Lin ........................ G06F 1/1681 |
| 2021/0081007 | A1* | 3/2021 | Jan ........................ G06F 1/1681 |
| 2021/0096608 | A1* | 4/2021 | Hallar ................ E05D 11/1028 |

FOREIGN PATENT DOCUMENTS

| JP | 2013-118437 A | 6/2013 |
| JP | 2014-062644 A | 4/2014 |
| JP | 2016-134051 A | 7/2016 |
| JP | 2018-116467 A | 7/2018 |
| WO | WO-2021127684 A1 * | 6/2021 |

* cited by examiner

*Primary Examiner* — Adrian S Wilson
*Assistant Examiner* — Gage Crum
(74) *Attorney, Agent, or Firm* — Antony P. Ng; Russell Ng PLLC (57) ABSTRACT

A portable information device capable of reducing a gap between two displays is described. The portable information device includes a first chassis, a second chassis adjacent to the first chassis, a first display provided on a top surface of the first chassis, a second display provided on a top surface of the second chassis, a hinge device, and at least one link mechanism operating in conjunction with the rotational operation between the first chassis and the second chassis by the hinge device. At least one of the first chassis and the second chassis is provided to be relatively slidable with respect to the hinge device along an arranging direction of the first chassis and the second chassis. The link mechanism includes a first slider, a first shaft output portion, a second slider, a second shaft output portion, and a driving part.

9 Claims, 11 Drawing Sheets

PORTABLE INFORMATION DEVICE HAVING CHASSIS ROTATABLY CONNECTED BY A HINGE

PRIORITY CLAIM

The present application claims benefit of priority under 35 U.S.C. §§ 120, 365 to the previously filed Japanese Patent Application No. JP2020-012484 with a priority date of Jan. 29, 2020, which is incorporated by reference herein.

TECHNICAL FIELD

The present invention relates to portable information devices in general, and in particular to a portable information device having chassis rotatably connected by a hinge.

BACKGROUND

In recent years, portable information devices, such as a tablet personal computer (tablet PC) and a smart phone, that provide a touch panel type liquid crystal display but without a physical keyboard, have gained popularity. The display of this kind of portable information device has been designed to be large when being in use but miniaturized when it is being stored. In other words, such a portable information device can be made smaller by closing the chassis when it is carried or stored, while two displays can be used as one large screen by arranging the chassis in a plate form when the portable information device is being in use.

In one configuration, a hinge shaft is disposed in substantially the center in a thickness direction of each chassis. Thus, the chassis can be made thinner since the hinge shaft never protrudes out from a surface of the chassis, and further it is possible to change into different use modes by rotating the chassis from a 0-degree position to a 360-degree position. However, an adjacent end face of each chassis is formed in an arc shape in a side view in order to avoid interference in a rotational operation. As a result, a gap that is formed between two displays becomes larger, and when the two displays are being used as one large screen, a wide dividing region is formed in the center of the display screen.

Consequently, it would be desirable to provide a portable information device capable of reducing a gap between two displays when the two displays are being used as one large screen.

SUMMARY

In accordance with an embodiment of the present disclosure, a portable information device includes a first display provided on a top surface of a first chassis; a second display provided on a top surface of a second chassis; a hinge device to change the first and second chassis to a plate form in which the top surfaces are arranged side-by-side in an in-plane direction, a first stacked form in which the top surfaces are disposed to be overlapped to face each other, and a second stacked form in which bottom surfaces are disposed to be overlapped to face each other; and a link mechanism to operate in conjunction with rotational operations between the first and second chassis by the hinge device, wherein at least one of the first and second chassis is provided to be relatively slidable with respect to the hinge device along an arranging direction of the first and second chassis.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
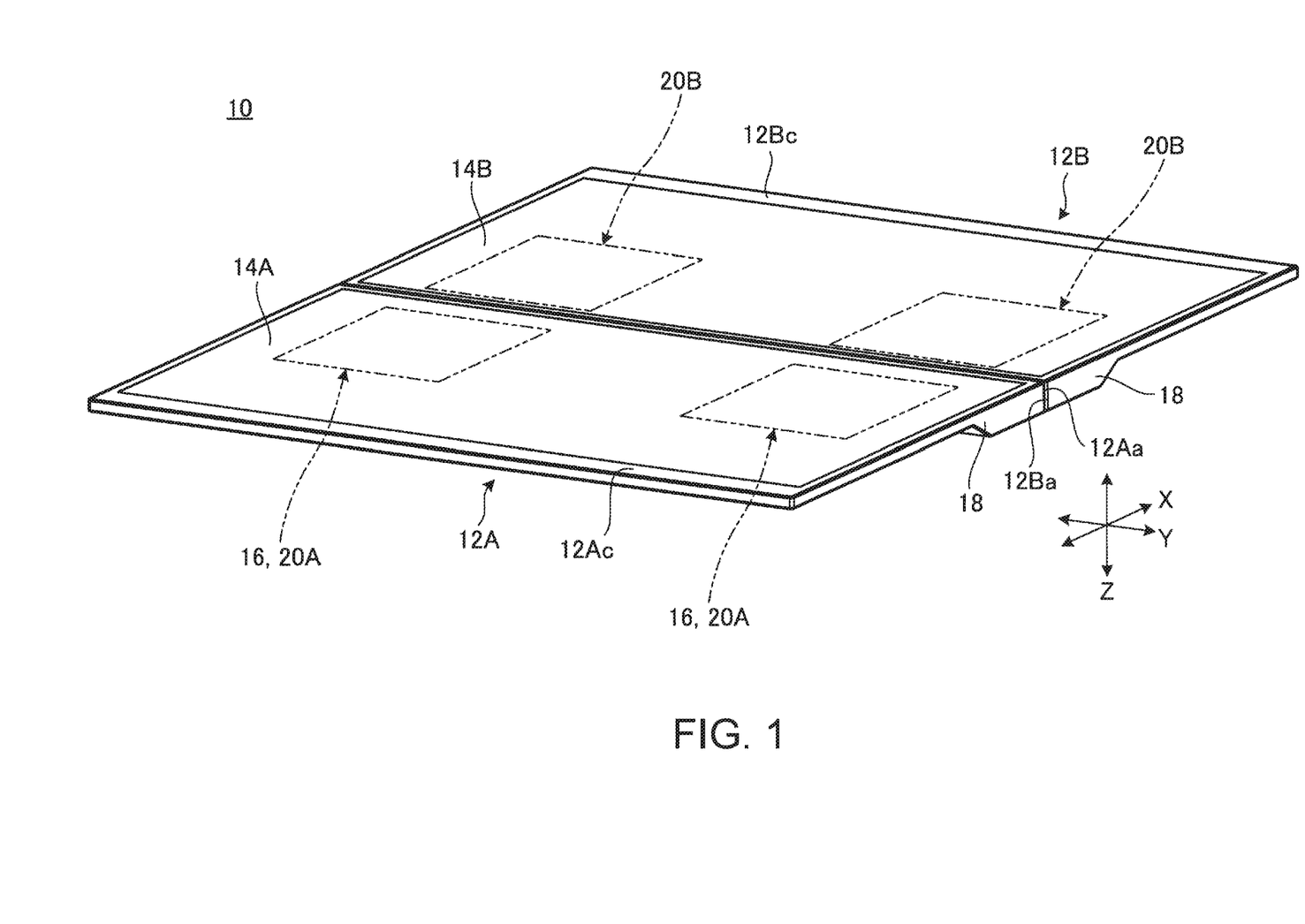
FIG. 1 is a perspective view of a portable information device in a 180-degree position, according to one embodiment.
Figure 2:
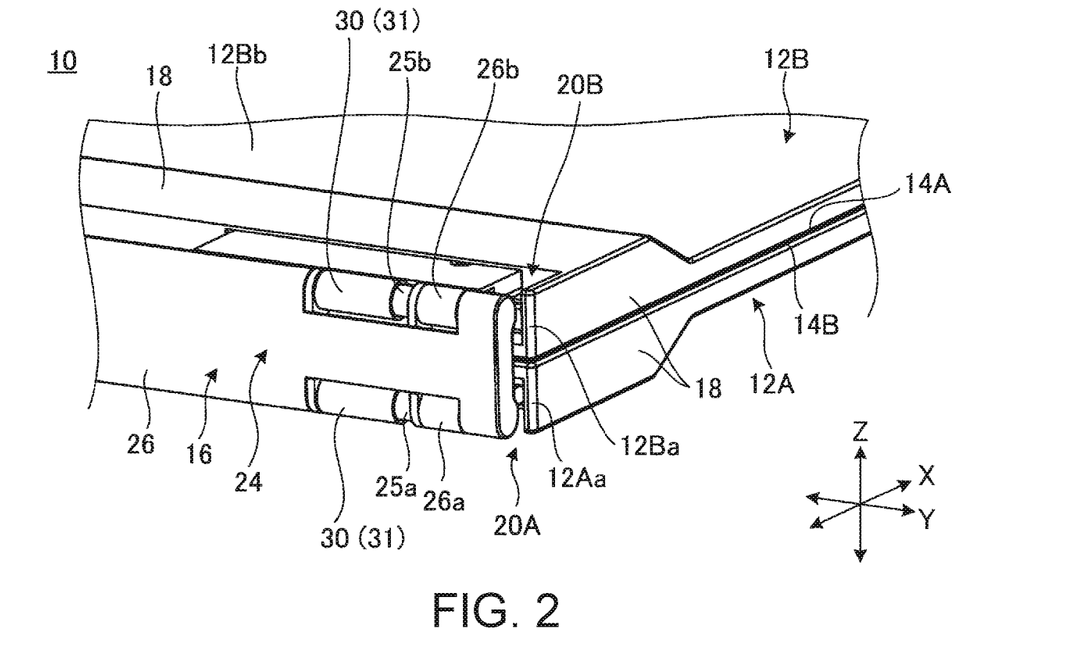
FIG. 2 is a partially enlarged perspective view of the portable information device from FIG. 1 in a 0-degree position.
Figure 3:
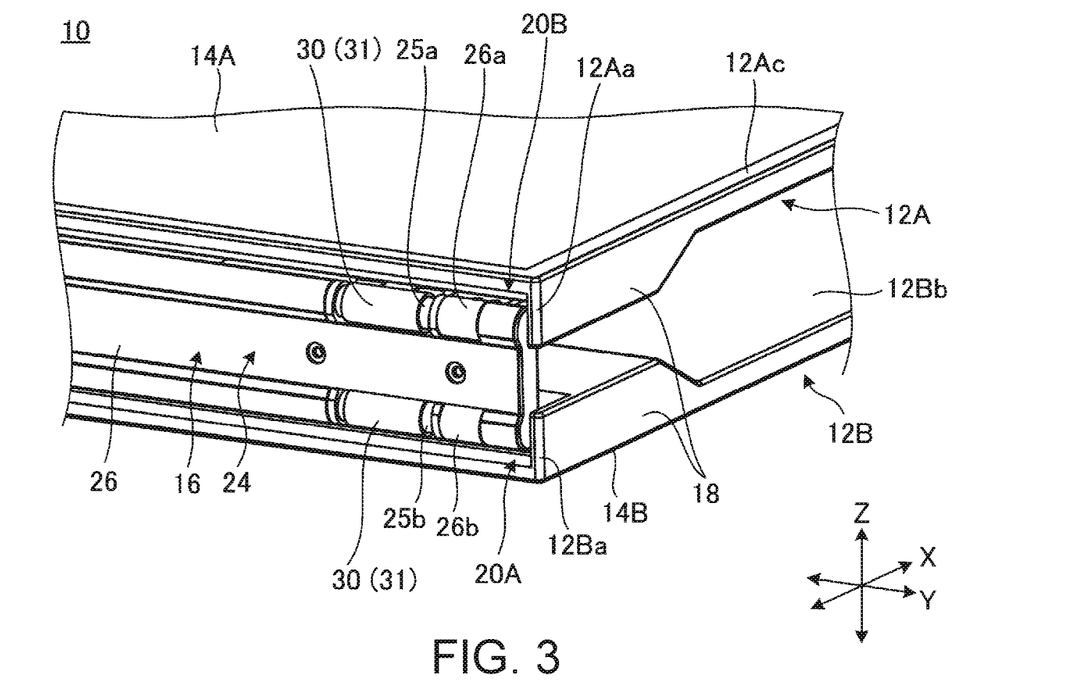
FIG. 3 is a partially enlarged perspective view of the portable information device from FIG. 1 in a 360-degree position.

FIG. 1 is a perspective view of a portable information device 10 in a 180-degree position, according to one embodiment. FIG. 2 is a partially enlarged perspective view of the portable information device 10 in a 0-degree position. FIG. 3 is a partially enlarged perspective view of the portable information device 10 in a 360-degree position.

As illustrated in FIG. 1 to FIG. 3, the portable information device 10 includes a first chassis 12A and a second chassis 12B, a first display 14A and a second display 14B, and a hinge device 16. In the present embodiment, a tablet PC that is foldable into a double-folded state like a book is illustrated as the portable information device 10 by an example. The portable information device 10 may be a cellular phone, a smart phone, an electronic notebook or a portable game console etc.

Figure 4A:
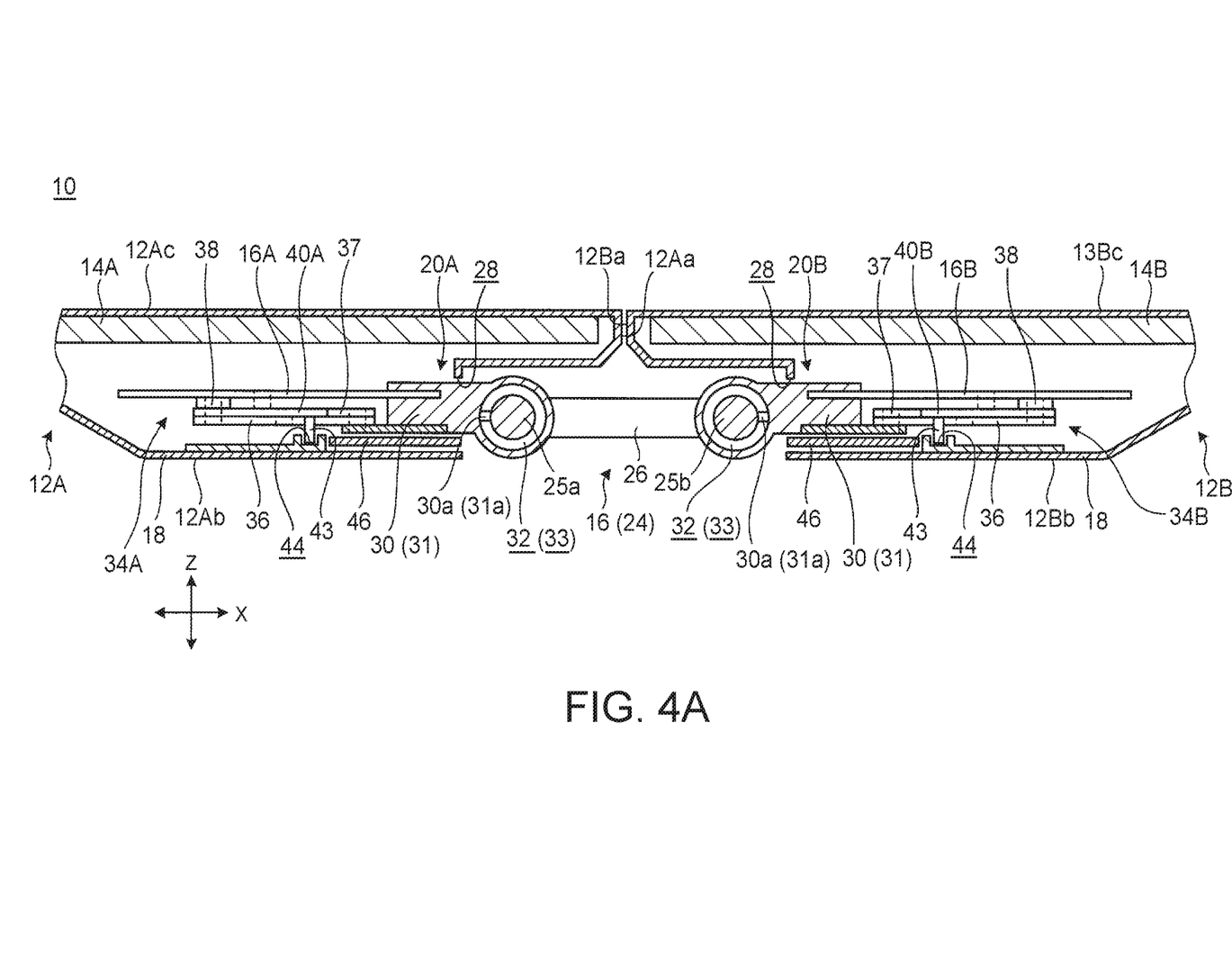
FIG. 4A is an enlarged side cross-sectional view of a main part in the 180-degree position.

The chassis 12A and 12B respectively have one edge portions 12Aa and 12Ba that are adjacent edge portions to each other and connected with the hinge device 16. The hinge device 16 connects the respective chassis 12A and 12B so that they can rotate from the 0-degree position (first stacked form) as illustrated in FIG. 2 and FIG. 4C to the 360-degree position (second stacked form) as illustrated in FIG. 3 and FIG. 4D through the 180-degree position (plate form) as illustrated in FIG. 1 and FIG. 4A. In the 0-degree position, the chassis 12A and 12B are disposed to be overlapped, and display surfaces of the displays 14A and 14B, i.e., top surfaces 12Ac and 12Bc of the chassis 12A and 12B face each other. In the 180-degree position, the respective chassis 12A and 12B are arranged side-by-side in an in-plane direction in substantially the same plane, and respective displays 14A and 14B are integrated to form substantially one large screen. In the 360-degree position, the chassis 12A and 12B are disposed to be overlapped in an orientation opposite to the 0-degree position, and bottom surfaces 12Ab and 12Bb of the respective chassis 12A and 12B face each other.

Hereinafter, the portable information device 10 as illustrated in FIG. 1 to FIG. 3 is described while an arranging direction of the chassis 12A and 12B is referred to as X direction, a direction along the one edge portions 12Aa and 12Ba of the chassis 12A and 12B is referred to as Y direction, and a thickness direction of the respective chassis 12A and 12B is referred to as Z direction.

The chassis 12A and 12B are rectangular thin box bodies. The chassis 12A and 12B are formed of metallic plates of stainless steel, magnesium, or aluminum etc., or fiber reinforced resin plates containing various resin materials, carbon fibers, or the like, for example, in a box shape. The chassis 12A and 12B each have a bulged part 18 of substantially trapezoidal shape in a side view at and around the one edge portions 12Aa and 12Ba, the bulged part 18 having a plate thickness larger than that of other parts and being formed by bulging out the bottom surfaces 12Ab and 12Bb. The chassis 12A and 12B have a structure in which most of their plate thicknesses are very thin. Then, parts of the chassis 12A and 12B are provided with the bulged parts 18, in which the hinge device 16 and link mechanisms 20A and 20B as mentioned later are stored. The portable information device 10 may not be provided with the bulged part 18 and may be formed of uniform thickness throughout. Within the respective chassis 12A and 12B, a board having an arithmetic device mounted thereon, a battery device, an antenna, and various electronic parts such as a cooling device are mounted. The respective chassis 12A and 12B are connected in a state of being each relatively slidable in the X direction with respect to the hinge device 16.

The displays 14A and 14B are touch panel type liquid crystal displays, for example. The displays 14A and 14B are fixed to the top surfaces 12Ac and 12Bc of the chassis 12A and 12B, respectively.

The one edge portions 12Aa and 12Ba of the chassis 12A and 12B of the present embodiment have end faces which are formed of vertical planes along the Z direction (refer to FIG. 1 and FIG. 4A). These end faces of the one edge portions 12Aa and 12Ba are in contact with or close to each other in the 180-degree position. Thus, in the portable information device 10 in the 180-degree position, the displays 14A and 14B extend continuously substantially without a gap between the chassis 12A and 12B formed in one plate shape so as to form one large screen.

Next, a configuration example of the hinge device 16 will be described.

Figure 4B:
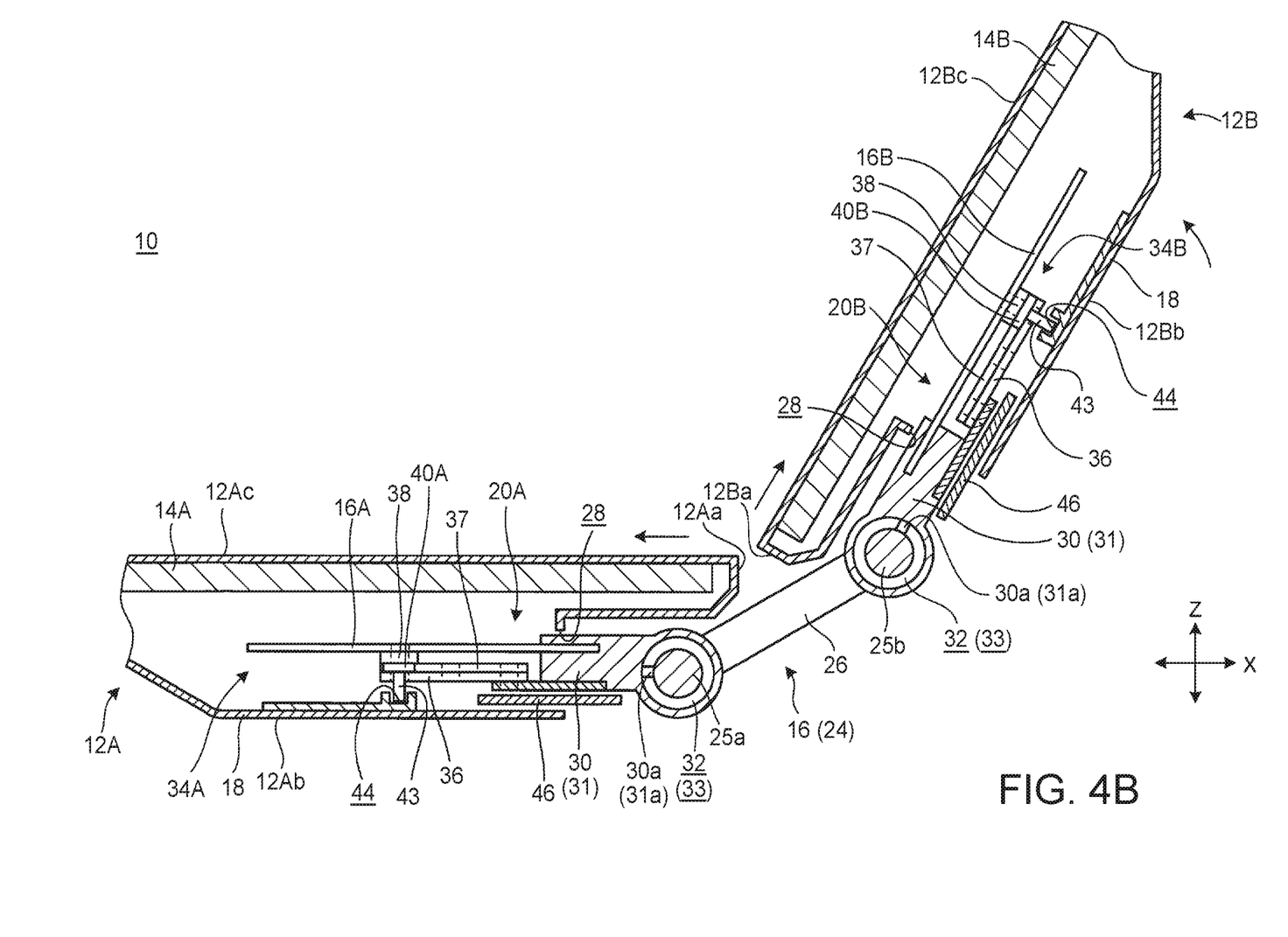
FIG. 4B is an enlarged side cross-sectional view of a main part in a state halfway through an operation from the 180-degree position to the 0-degree position.
Figure 4C:
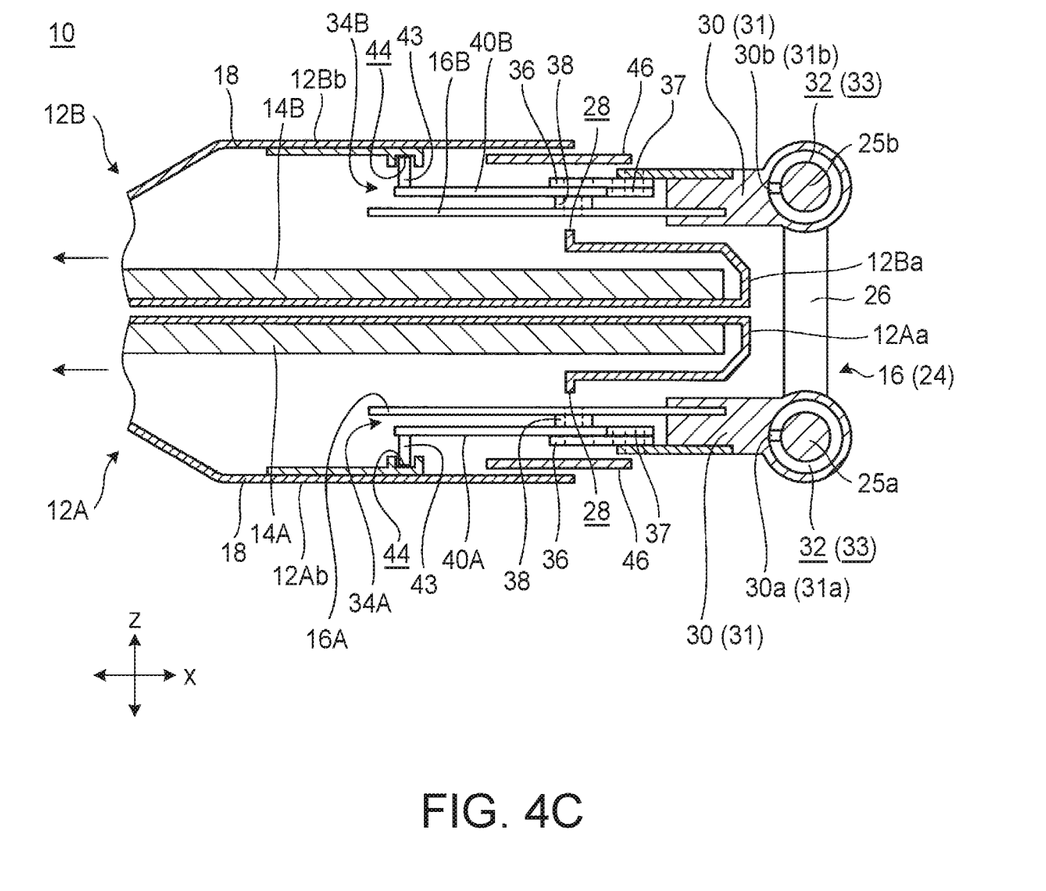
FIG. 4C is an enlarged side cross-sectional view of a main part in the 0-degree position.
Figure 4D:
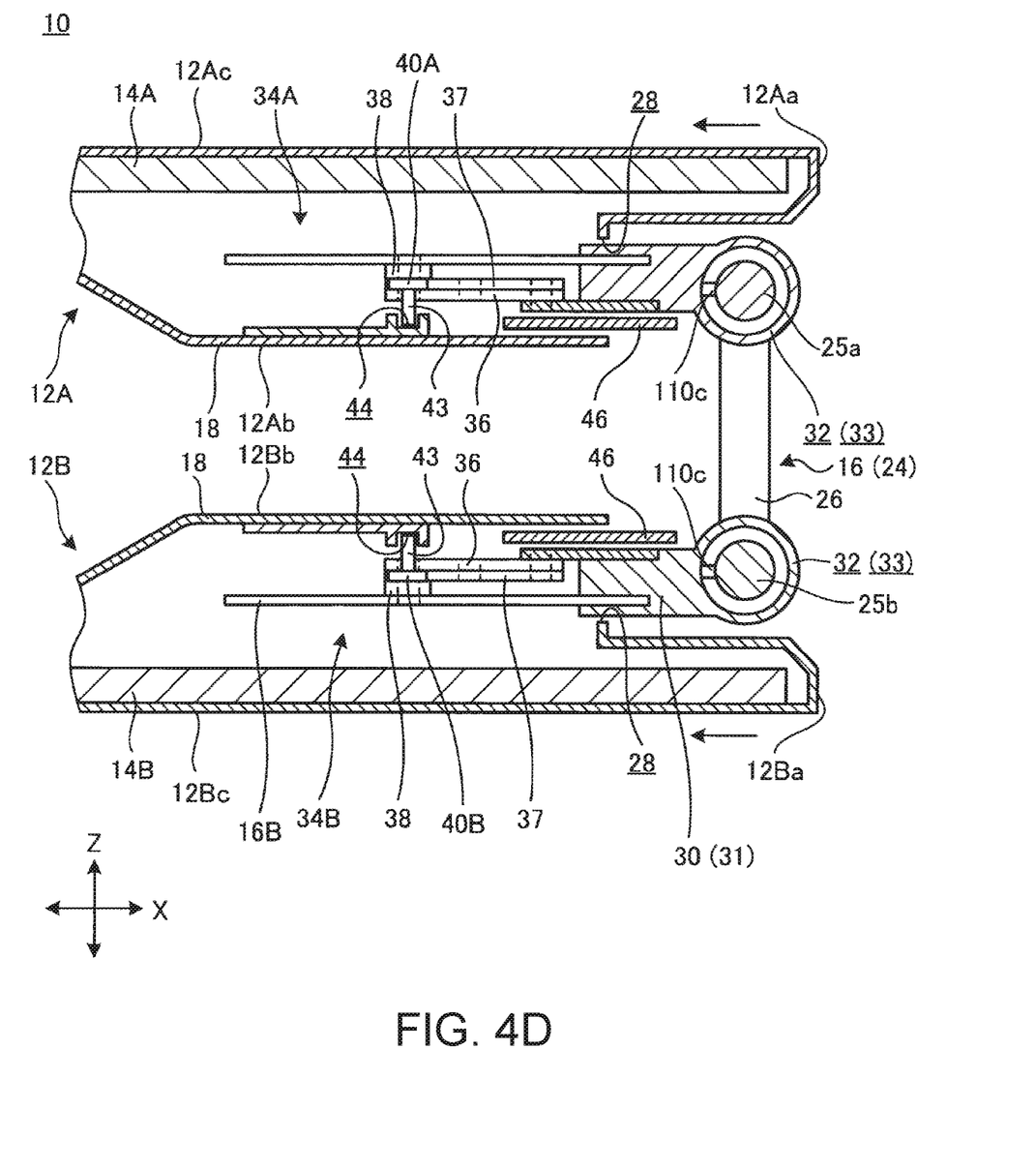
FIG. 4D is an enlarged side cross-sectional view of a main part in the 360-degree position.
Figure 5A:
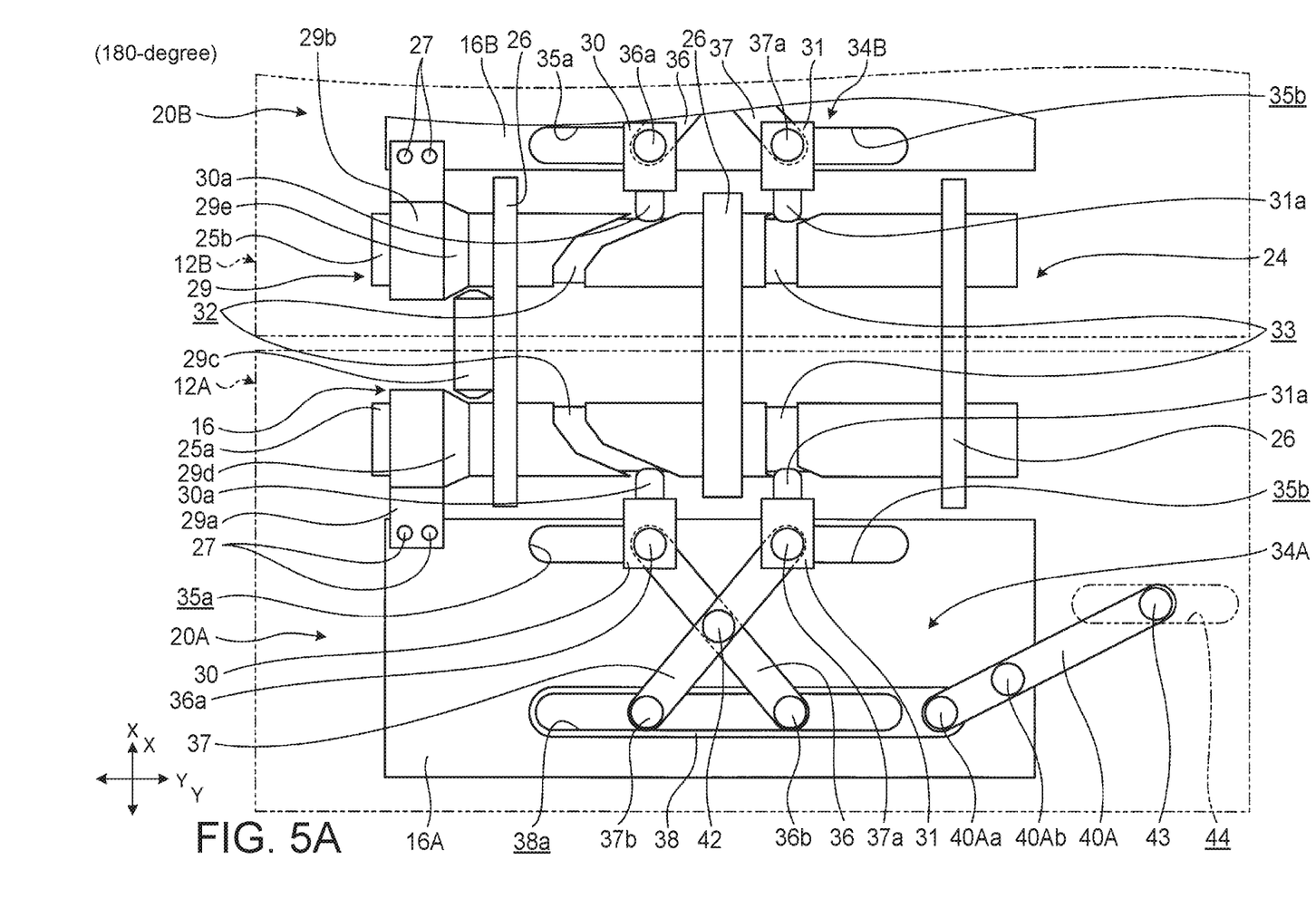
FIG. 5A is a bottom view illustrating a state of a first link mechanism in the 180-degree position.
Figure 5B:
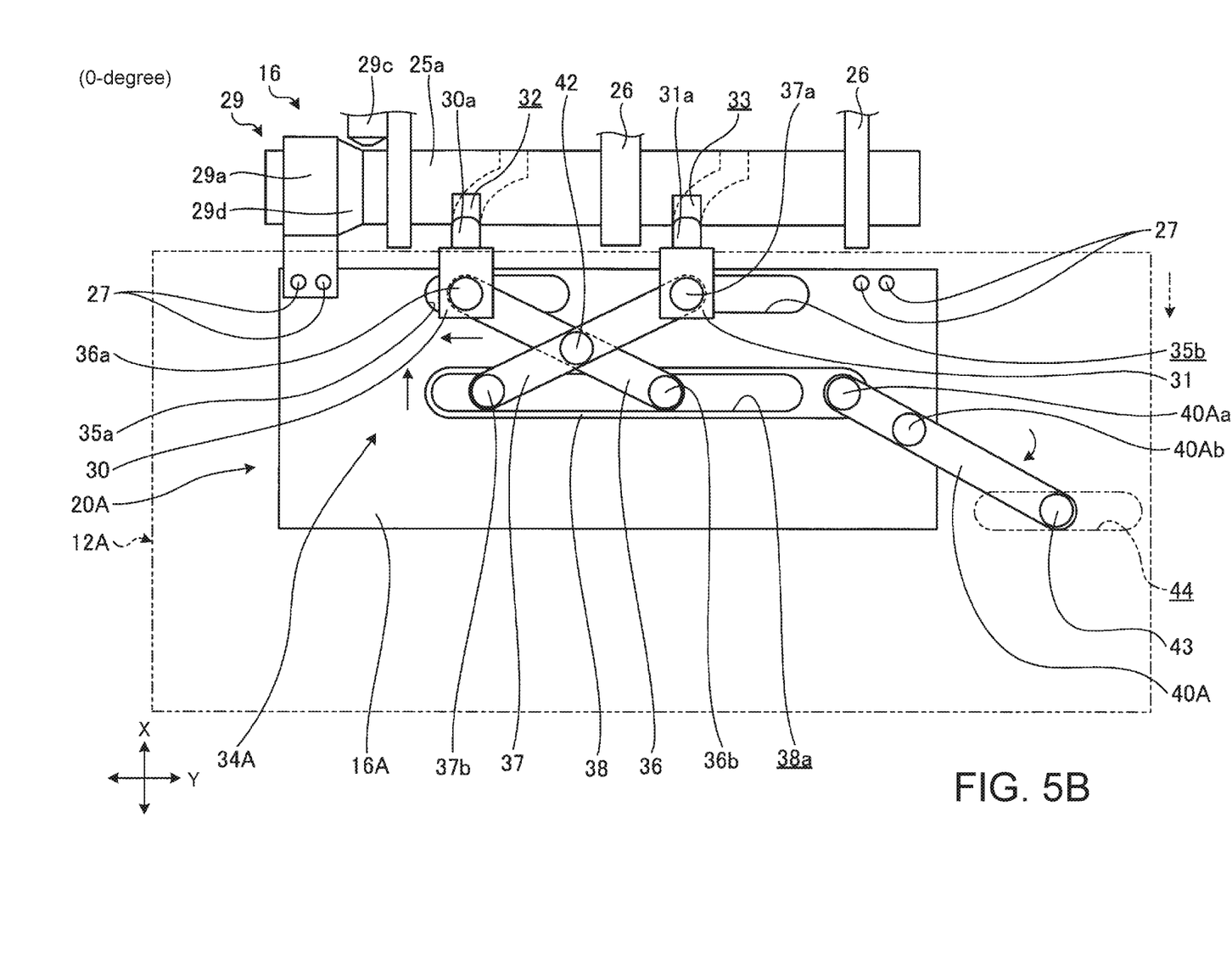
FIG. 5B is a bottom view illustrating a state of the first link mechanism in the 0-degree position.
Figure 5C:
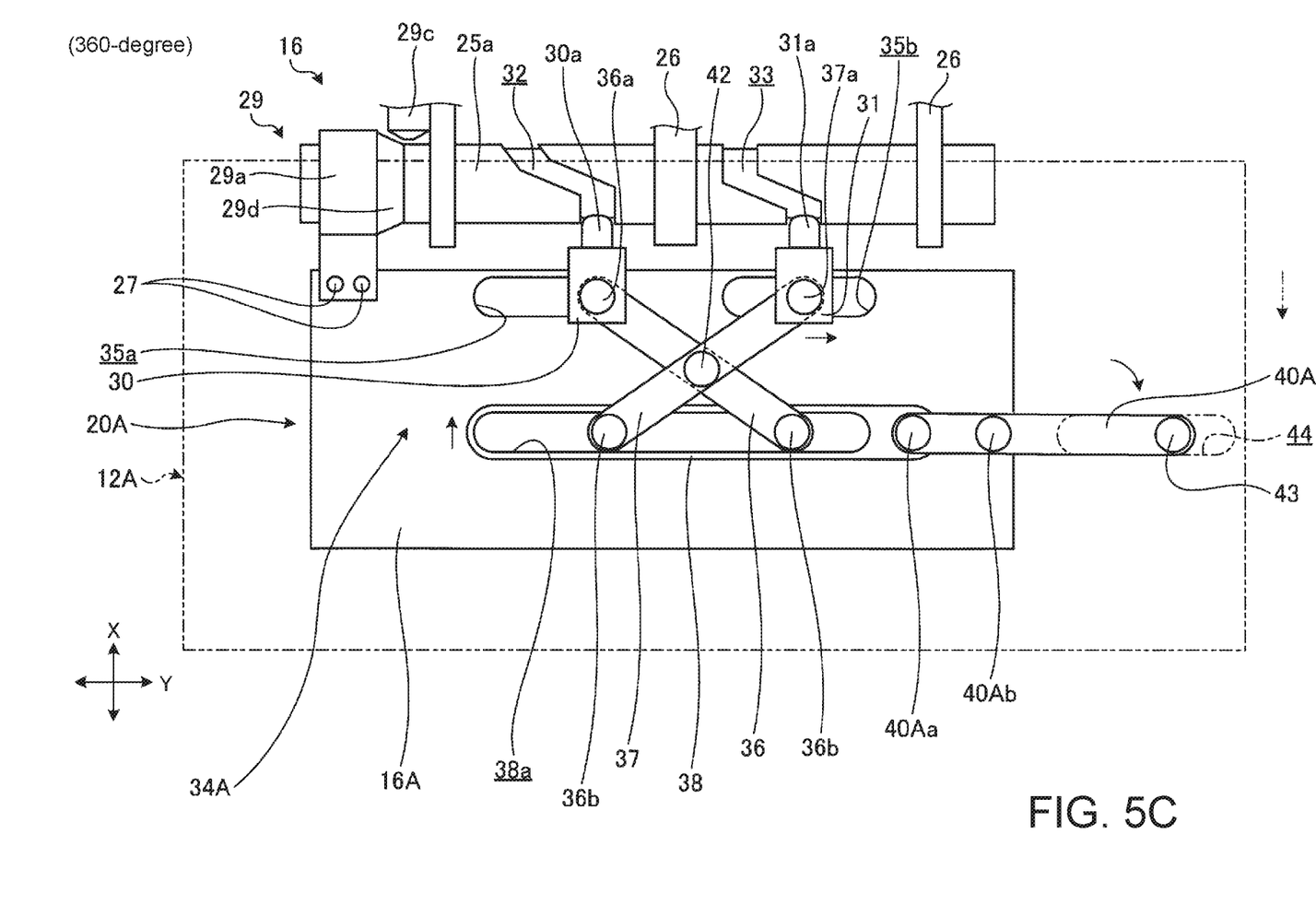
FIG. 5C is a bottom view illustrating a state of the first link mechanism in the 360-degree position.

FIG. 4A to FIG. 4D are enlarged side cross-sectional views illustrating the rotational operation of the chassis 12A and 12B by the hinge device 16. FIG. 4A illustrates the 180-degree position. FIG. 4B illustrates a state halfway through the rotation from the 180-degree position to the 0-degree position. FIG. 4C illustrates the 0-degree position. FIG. 4D illustrates the 360-degree position. FIG. 5A to FIG. 5C are bottom views illustrating the operation of the link mechanism 20A (20B) in the rotational operation of the chassis 12A and 12B by the hinge device 16. FIG. 5A illustrates the 180-degree position. FIG. 5B illustrates the 0-degree position. FIG. 5C illustrates the 360-degree position.

As illustrated in FIG. 1, a pair of the hinge devices 16 is provided in the Y direction. The respective hinge devices 16 are each disposed at both ends in the Y direction of the one edge portions 12Aa and 12Ba of the chassis 12A and 12B.

As illustrated in FIG. 2, FIG. 3, FIG. 4A and FIG. 5A, each hinge device 16 shares a hinge shaft connecting body 24 that extends along the one edge portions 12Aa and 12Ba. Each hinge device 16 includes a first hinge base 16A and a second hinge base 16B. Each of the hinge bases 16A and 16B is a substantially rectangular metallic plate. The first hinge base 16A is a connecting plate to the first chassis 12A. The second hinge base 16B is a connecting plate to the second chassis 12B.

The hinge shaft connecting body 24 includes a first hinge shaft 25a and a second hinge shaft 25b that are arranged in the X direction, a bridge part 26 that connects the hinge shafts 25a and 25b, and a supporting mechanism part 29.

The two hinge shafts 25a and 25b are disposed so that their mutual axial directions are parallel, and are connected by the bridge part 26. The bridge part 26 is a metallic component that is provided across the hinge shafts 25a and 25b, and unrotatably supports the respective hinge shafts 25a and 25b. For example, two or more bridge parts 26, or three bridge parts 26 in the present embodiment, are arranged in parallel at appropriate intervals in the axial direction of the hinge shafts 25a and 25b and externally fitted onto the hinge shafts 25a and 25b.

As illustrated in FIG. 5A, the first hinge shaft 25a is connected to the first hinge base 16A on the first chassis 12A side through the supporting mechanism part 29. The second hinge shaft 25b is connected to the second hinge base 16B on the second chassis 12B side through the supporting mechanism part 29. The supporting mechanism part 29 has a first cylindrical body 29a, a second cylindrical body 29b, and a gear shaft 29c that extends between the cylindrical bodies 29a and 29b.

The first cylindrical body 29a is a metallic cylinder that functions as a bearing rotatably supporting the first hinge shaft 25a around the shaft. The first cylindrical body 29a has a mounting plate that protrudes from an outer peripheral surface and this mounting plate is fixed to the first hinge base 16A through screws 27. The second cylindrical body 29b is a metallic cylinder that functions as a bearing rotatably supporting the second hinge shaft 25b around the shaft. The second cylindrical body 29b has a mounting plate that protrudes from an outer peripheral surface and this mounting plate is fixed to the second hinge base 16B through screws 27.

The cylindrical bodies 29a and 29b have gears 29d and 29e, respectively, at one end face in the axial direction of the hinge shafts 25a and 25b. The gear shaft 29c is a metallic shaft that has gears formed at its both ends, and is rotatably supported on the bridge part 26 adjacent thereto, for example. The gears 29d and 29e each engage with each gear of the gear shaft 29c. Each of the gears 29d and 29e and each gear of the gear shaft 29c are a helical gear, for example.

Thus, the supporting mechanism part 29 functions as a supporting bracket that connects the hinge shaft connecting body 24 to each of the hinge bases 16A and 16B. The supporting mechanism part 29 further functions as a synchronization mechanism that synchronizes the relative rotation of the first cylindrical body 29a relative to the first hinge shaft 25a and that of the second cylindrical body 29b relative to the second hinge shaft 25b. With this, when the chassis 12A and 12B of the portable information device 10 are rotated, the respective hinge bases 16A and 16B relatively rotate with respect to the respective hinge shafts 25a and 25b connected by the bridge part 26 through the respective cylindrical bodies 29a and 29b. At that time, the respective link mechanisms 20A and 20B supported by the respective hinge bases 16A and 16B also rotate around the respective hinge shafts 25a and 25b.

The hinge device 16 has torque generating parts 26a and 26b at ends of the respective hinge shafts 25a and 25b (refer to FIG. 2 and FIG. 3). The torque generating parts 26a and 26b apply a predetermined rotation torque to the relative rotation between the cylindrical bodies 29a and 29b and the hinge shafts 25a and 25b. This applies a predetermined rotation torque to the mutual relative rotational operation between the chassis 12A and 12B.

It is to be noted that the hinge shafts 25a and 25b may be configured to be rotatably supported with respect to the bridge part 26. If they are so configured, the respective cylindrical bodies 29a and 29b of the supporting mechanism part 29 are unrotatably fixed with respect to the respective hinge shafts 25a and 25b. Further, shaft output portions 32 and 33 are formed as cam faces, for example, on end faces of cylindrical bodies that are rotatably externally inserted with respect to the hinge shafts 25a and 25b and unrotatably connected with respect to the bridge part 26, instead of the outer peripheral surfaces of the hinge shafts 25a and 25b. Then, for example, a configuration in which pins 30a and 31a are brought into sliding contact with the shaft output portions 32 and 33 composed of the cam faces, allows the same operation as the configuration example as illustrated in FIG. 5A.

Next, a connecting structure between the hinge device 16 and the chassis 12A and 12B will be described.

As illustrated in FIG. 4A to FIG. 4D, the first chassis 12A is connected to be relatively slidable with respect to the first hinge base 16A in the X direction. The second chassis 12B is connected to be relatively slidable with respect to the second hinge base 16B in the X direction.

As illustrated in FIG. 4A, the first chassis 12A has an opening 28 below the one edge portion 12Aa. The hinge device 16 is inserted into the first chassis 12A through the opening 28, and connected to the first chassis 12A through the first link mechanism 20A. The second chassis 12B has a symmetric structure to the first chassis 12A. That is, into the second chassis 12B, the hinge device 16 is inserted through the opening 28 provided below the one edge portion 12Ba. The second chassis 12B is connected to the hinge device 16 through the second link mechanism 20B.

The first link mechanism 20A is a mechanism that operates in conjunction with the rotational operation between the chassis 12A and 12B by the hinge device 16 and relatively moves the first chassis 12A and the hinge device 16 in the X direction. The second link mechanism 20B is a mechanism that operates in conjunction with the rotational operation between the chassis 12A and 12B by the hinge device 16 and relatively moves the second chassis 12B and the hinge device 16 in the X direction.

As illustrated in FIG. 4A and FIG. 5A, the first link mechanism 20A includes a pair of sliders 30 and 31, a pair of the shaft output portions 32 and 33, and a first driving part 34A. It is to be noted that the second chassis 12B and second link mechanism 20B have a symmetric structure to the first chassis 12A and first link mechanism 20A. Then, respective elements of the second chassis 12B and second link mechanism 20B are followed by the same symbols as those of the respective elements of the first chassis 12A and first link mechanism 20A and detailed description thereof is omitted.

The sliders 30 and 31 are arranged in the axial direction (the Y direction) of the first hinge shaft 25a. The slider 30 is, for example, a cylindrical member, and the first hinge shaft 25a is inserted through an axial through-hole of the slider 30. The slider 30 is linked with the shaft output portion 32. The slider 30 is externally inserted to be relatively movable with respect to the hinge shaft 25a in the axial direction. The pin 30a is protrusively provided on the slider 30. The pin 30a slidably engages with the shaft output portion 32 formed on the outer peripheral surface of the first hinge shaft 25a. In FIG. 5A etc., the slider 30 (31) is illustrated not as a cylindrical member but as a blockish component, in order to clearly indicate a linking state between the sliders 30 and 31 and the first hinge shaft 25a. The slider 30 (31) is provided to be relatively movable with respect to the first hinge shaft 25a in the axial direction thereof, and its shape or structure may be appropriately modified as long as the pin 30a (31a) slidably engages with the shaft output portion 32 (33).

The slider 31 is linked with the shaft output portion 33. A basic configuration of the slider 31 is similar to that of the slider 30. That is, the slider 31 is provided to be relatively movable with respect to the first hinge shaft 25a in the axial direction, and the protrusively provided pin 31a slidably engages with the shaft output portion 33 formed on the outer peripheral surface of the first hinge shaft 25a.

Figure 6A:
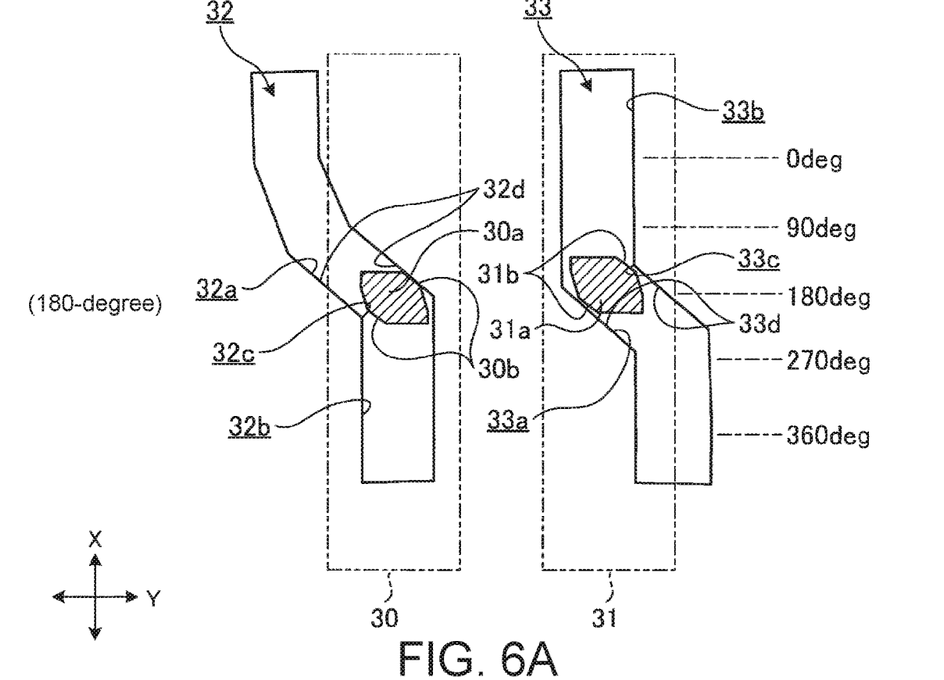
FIG. 6A is a developed view in a circumferential direction of a first hinge shaft in the 180-degree position.
Figure 6B:
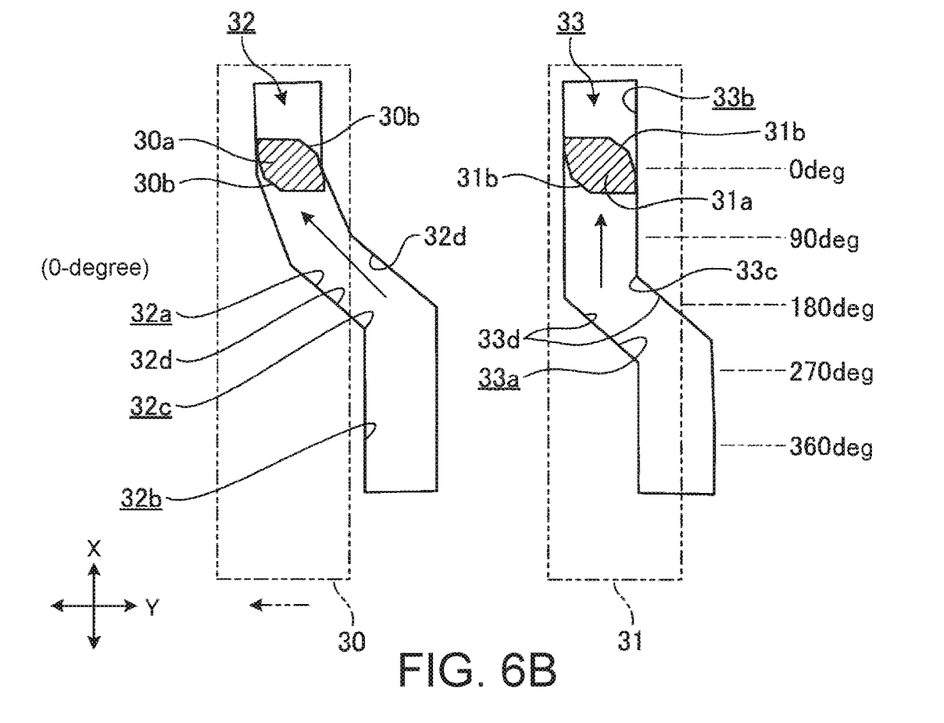
FIG. 6B is a developed view in the circumferential direction of the first hinge shaft in the 0-degree position.
Figure 6C:
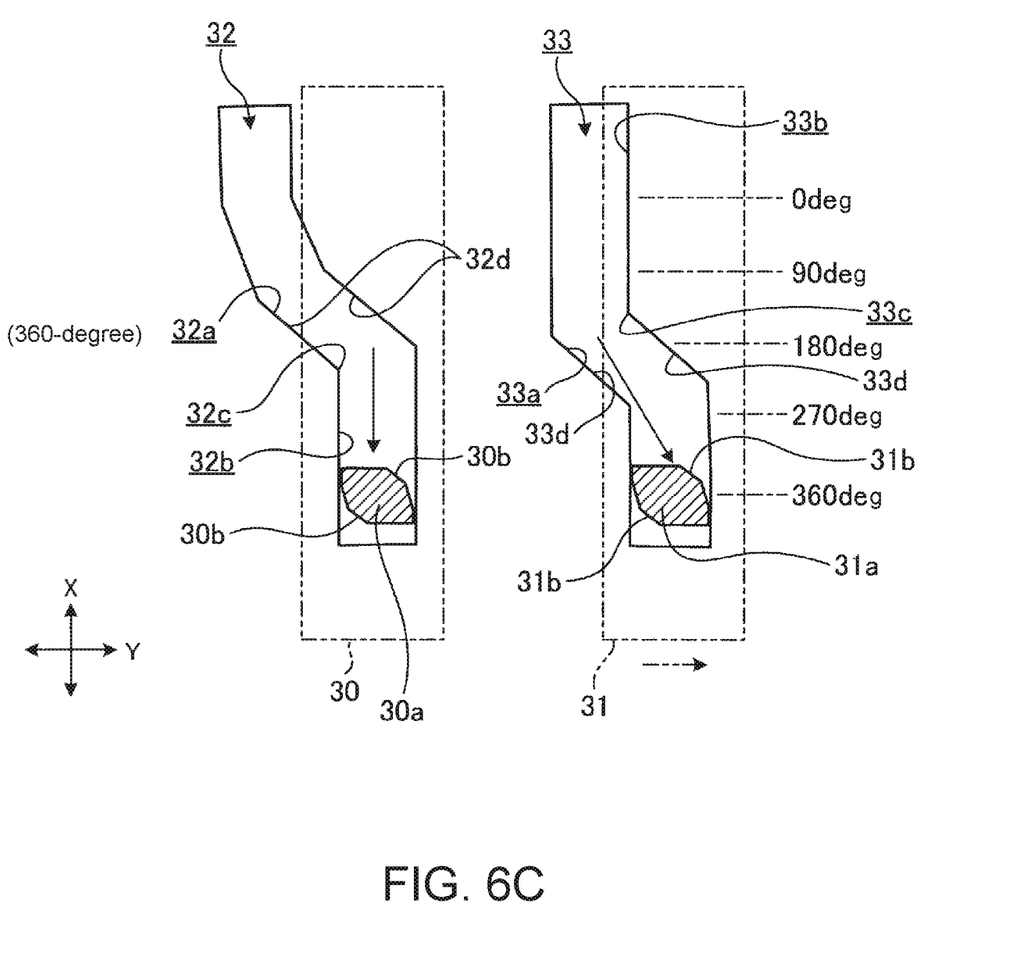
FIG. 6C is a developed view in the circumferential direction of the first hinge shaft in the 360-degree position.

FIG. 6A to FIG. 6C are explanatory drawings in which the first hinge shaft 25a is developed in a circumferential direction to illustrate configurations of the shaft output portions 32 and 33. FIG. 6A illustrates the 180-degree position. FIG. 6B illustrates the 0-degree position. FIG. 6C illustrates the 360-degree position.

As illustrated in FIG. 5A and FIG. 6A, the shaft output portion 32 is a helical groove part that is formed on the outer peripheral surface of the first hinge shaft 25a and is gradually displaced in the axial direction (the Y direction) along the circumferential direction of the outer peripheral surface. The shaft output portion 32 forms a substantially crank shape in a state as illustrated in FIG. 6A in which the first hinge shaft 25a is developed in the circumferential direction. As illustrated in FIG. 6A, the shaft output portion 32 has a cam part 32a and a neutral part 32b.

The cam part 32a extends along the circumferential direction of the first hinge shaft 25a to be inclined in the axial direction. The cam part 32a of the present embodiment has two different inclination angles from a boundary portion 32c of the neutral part 32b. The cam part 32a has a large inclination angle near the boundary portion 32c and a gentle inclination angle from the middle. The neutral part 32b extends along the circumferential direction of the first hinge shaft 25a. The neutral part 32b continues from the cam part 32a.

The pin 30a is movable from the cam part 32a to the neutral part 32b while sliding. In the 180-degree position, the pin 30a is disposed at a position that is nearer to the cam part 32a than to the neutral part 32b in the boundary portion 32c (refer to FIG. 6A). In the operation in which the chassis 12A and 12B rotate from the 180-degree position to the 0-degree position, the pin 30a moves through the cam part 32a from the boundary portion 32c (refer to FIG. 6B). In the operation in which the chassis 12A and 12B rotate from the 180-degree position to the 360-degree position, the pin 30a moves through the neutral part 32b from the boundary portion 32c (refer to FIG. 6C). While the pin 30a is moving through the cam part 32a, i.e., in the operation between the 180-degree position and the 0-degree position, its position in the Y direction changes and the slider 30 is moved in the axial direction of the first hinge shaft 25a.

As illustrated in FIG. 5A and FIG. 6A, the shaft output portion 33 is formed on the outer peripheral surface of the first hinge shaft 25a and arranged side-by-side with the shaft output portion 32. The shaft output portion 33 is a helical groove part that is gradually displaced in the axial direction (the Y direction) along the circumferential direction of the outer peripheral surface of the first hinge shaft 25a. The shaft output portion 33 forms a substantially crank shape in a state as illustrated in FIG. 6A in which the first hinge shaft 25a is developed in the circumferential direction. As illustrated in FIG. 6A, the shaft output portion 33 has a cam part 33a and a neutral part 33b.

The cam part 33a extends along the circumferential direction of the first hinge shaft 25a to be inclined in the axial direction. The cam part 33a of the present embodiment extends at a constant inclination angle from the boundary portion 33c between the cam part 33a and the neutral part 33b, unlike the cam part 32a. In the present embodiment, an amount of displacement of the cam part 33a in the Y direction is configured to be smaller than that of the cam part 32a in the Y direction. The neutral part 33b extends along the circumferential direction of the first hinge shaft 25a. The neutral part 33b continues from the cam part 33a.

The pin 31a is movable from the cam part 33a to the neutral part 33b while sliding. In the 180-degree position, the pin 31a is disposed at a position that is nearer to the cam part 33a than to the neutral part 33b in the boundary portion 33c (refer to FIG. 6A). In the operation in which the chassis 12A and 12B rotate from the 180-degree position to the 0-degree position, the pin 31a moves through the neutral part 33b from the boundary portion 33c (refer to FIG. 6B). In the operation in which the chassis 12A and 12B rotate from the 180-degree position to the 360-degree position, the pin 31a moves through the cam part 33a from the boundary portion 33c (refer to FIG. 6C). While the pin 31a is moving through the cam part 33a, i.e., in the operation between the 180-degree position and the 360-degree position, its position in the Y direction changes and the slider 31 is moved in the axial direction of the first hinge shaft 25a.

As illustrated in FIG. 6A to FIG. 6C, the pins 30a and 31a of the present embodiment have tip parts to be at least inserted into the shaft output portions 32 and 33, the tip parts forming a substantially hexagonal shape in cross section. The pin 30a thus has outer surfaces 30b that are substantially parallel to both side surfaces 32d forming a groove part of the cam part 32a on both sides. Similarly, the pin 31a has outer surfaces 31b that are substantially parallel to both side surfaces 33d forming a groove part of the cam part 33a on both sides. As a result, the pins 30a and 31a slide onto the cam parts 32a and 33a more smoothly when the operations from the boundary portions 32c and 33c are started. The pins 30a and 31a may have a circular shape, or a polygonal shape other than a hexagonal shape, for example.

As illustrated in FIG. 5A, the first driving part 34A has a pair of link members 36 and 37, an output member 38, and a first lever member 40A.

The link members 36 and 37 are band plate-like members. A first end of the link member 36 is rotatably connected to the slider 30 through a connecting shaft 36a. A second end of the link member 36, which end is opposite the first end, is engaged with the output member 38 through an engagement pin 36b. A first end of the link member 37 is rotatably connected to the slider 31 through a connecting shaft 37a. A second end of the link member 37, which end is opposite the first end, is engaged with the output member 38 through an engagement pin 37b.

Reference symbols 35a and 35b in FIG. 5A are each guide holes into which the connecting shafts 36a and 37a are slidably inserted and that guide the movement of the sliders 30 and 31. The guide holes 35a and 35b are formed in the hinge bases 16A and 16B and extend in the Y direction.

The pair of link members 36 and 37 intersects each other to form an X shape. The link members 36 and 37 are connected at a position between respective first and second ends by a rotation shaft 42. That is, the link members 36 and 37 are connected at each substantially central portion that overlaps and intersects, by the rotation shaft 42. The link members 36 and 37 thus form a scissor structure through the central rotation shaft 42, and X-directional distance between the connecting shafts 36a and 37a and the engagement pins 36b and 37b increases or decreases.

The output member 38 is a band plate-like member that extends in the Y direction. The output member 38 is provided in a state of being movable along the X direction with respect to the first hinge base 16A of the hinge device 16. The output member 38 has a long hole 38a that extends along its longitudinal direction (the Y direction). The engagement pins 36b and 37b are arranged in the longitudinal direction and slidably engage with the long hole 38a. The link members 36 and 37 intersect each other. Thus, when the Y direction is used as a reference, the engagement pin 37b is disposed on the connecting shaft 36a side and the engagement pin 36b is disposed on the connecting shaft 37a side.

The first lever member 40A is a band plate-like member. The first lever member 40A is a member that rotates when the output member 38 is moved in the X direction and relatively slides the first chassis 12A with respect to the hinge device 16. The first lever member 40A has a first end that is rotatably connected to the output member 38 through the connecting shaft 40Aa. The first lever member 40A has a second end that engages with an output hole 44 of the first chassis 12A through a driving pin 43, the second end being opposite the first end. The output hole 44 is a long hole that extends in the Y direction. The output hole 44 is provided in an inner surface of the bottom surface 12Ab of the first chassis 12A, for example (refer to FIG. 4A). The first lever member 40A is rotatably supported with respect to the first hinge base 16A through a supporting shaft 40Ab between the first end and the second end.

As illustrated in FIG. 4A and FIG. 5A, the second link mechanism 20B has a symmetric structure to the first link mechanism 20A. The second link mechanism 20B has the same structure as the first link mechanism 20A except that it is connected to the second hinge shaft 25b instead of the first hinge shaft 25a, and disposed not on the first chassis 12A side but on the second chassis 12B side. That is, the second link mechanism 20B includes the sliders 30 and 31 connected to the second hinge shaft 25b, the shaft output portions 32 and 33 formed on the second hinge shaft 25b, and a second driving part 34B supported on the second hinge base 16B. The second driving part 34B has a symmetric structure to the first driving part 34A, and has the link members 36 and 37, the output member 38, and a second lever member 40B. The second lever member 40B is connected to the second chassis 12B.

It is to be noted that a reference symbol 46 in FIG. 4A to FIG. 4D is a cover plate that is fixed to the chassis 12A and 12B. The cover plate 46 covers over a gap between the one edge portions 12Aa and 12Ba from inside, which gap expands in the rotational operation between the chassis 12A and 12B.

Next, the operation and working effects of the first link mechanism 20A in the rotational operation of the chassis 12A and 12B by the hinge device 16 will be described. Because the operation of the second link mechanism 20B is the same as that of the first link mechanism 20A except for their symmetry, detailed description thereof is omitted.

When the portable information device 10 is in the 180-degree position as illustrated in FIG. 1, the first link mechanism 20A (the second link mechanism 20B) is in the state as illustrated in FIG. 5A. In this state, the pins 30a and 31a of the left and right sliders 30 and 31 are located at the boundary portions 32c and 33c of the shaft output portions 32 and 33, respectively (refer to FIG. 6A). Thus, the left and right sliders 30 and 31 are disposed closest to each other.

In the link members 36 and 37 in this state, the connecting shafts 36a and 37a are located closest to each other and the engagement pins 36b and 37b are also located closest to each other, as illustrated in FIG. 5A. Thus, the link members 36 and 37 are in a position in which they are elongated most in the X direction, and the output member 38 is located most apart from the first hinge shaft 25a in the X direction. As a result, the first lever member 40A is in a position to be rotated most counterclockwise in FIG. 5A on the supporting shaft 40Ab. Thus, the driving pin 43 is located closest to the first hinge shaft 25a in the X direction, and the first chassis 12A is located closest to the second chassis 12B (also refer to FIG. 4A). It is to be noted that the second link mechanism 20B of the second chassis 12B has a symmetric structure to the first link mechanism 20A. Thus, the second chassis 12B is also located closest to the first chassis 12A.

Based on the above, in the 180-degree position, the respective chassis 12A and 12B are both located closest to the hinge device 16. That is, the chassis 12A and 12B are in a closest position where the one edge portions 12Aa and 12Ba are in contact with or close to each other. Thus, the portable information device 10 is in use mode (large screen tablet mode) of the tablet PC in which the chassis 12A and 12B are arranged side-by-side in a plate form and the displays 14A and 14B form substantially one large screen. A user can therefore use the portable information device 10 as a large screen tablet PC.

By the way, as described above, in the 180-degree position, the pin 30a is located at the boundary portion 32c, but is at a position that is nearer to the cam part 32a than to the neutral part 32b (refer to FIG. 6A). Thus, the pin 30a is in a state in which its both outer surfaces 30b face the side surfaces 32d of the cam part 32a. Similarly, the pin 31a is located at the boundary portion 33c, but is at a position that is nearer to the cam part 33a than to the neutral part 33b. Thus, the pin 31a is in a state in which its both outer surfaces 31b face the side surfaces 33d of the cam part 33a.

Next, the operation when the portable information device 10 changes from the 180-degree position as illustrated in FIG. 4A to the 0-degree position as illustrated in FIG. 4C will be described. In this operation, the first link mechanism 20A (the second link mechanism 20B) rotates around the first hinge shaft 25a (the second hinge shaft 25b) with the first hinge base 16A (the second hinge base 16B). Thus, the pins 30a and 31a slide on the shaft output portions 32 and 33.

Specifically, as illustrated in FIG. 6A and FIG. 6B, the pin 30a of the slider 30 leaves the boundary portion 32c and slides on the cam part 32a at the same time. On the other hand, the pin 31a of the slider 31 leaves the boundary portion 33c and slides on the neutral part 33b. That is, the slider 30 moves to the left side in the drawing along the Y direction as illustrated in FIG. 5B. The position of the slider 31 in the Y direction does not change as illustrated in FIG. 5B.

As a result, in the first driving part 34A, the connecting shaft 36a moves in a direction that is apart from the connecting shaft 37a, as illustrated in FIG. 5B. Thus, the link member 36 is rotated anticlockwise in the drawing on the rotation shaft 42. This moves the engagement pin 36b toward the first hinge shaft 25a in the X direction, and the output member 38 is pressed to be moved toward the first hinge shaft 25a in the X direction. At the same time, the link member 37 is rotated clockwise in the drawing on the rotation shaft 42 as a result of the engagement pin 37b being pressed by the output member 38.

The link members 36 and 37 therefore assume a position that is most contracted in the X direction as illustrated in FIG. 5B, and the output member 38 is moved to a position that is closest to the first hinge shaft 25a in the X direction. As a result, the first lever member 40A assumes a position of being rotated most clockwise in FIG. 5B on the supporting shaft 40Ab. Thus, the driving pin 43 is moved to a position that is most apart from the first hinge shaft 25a in the X direction, and slides the first chassis 12A to a position that is most apart from the hinge device 16 (also refer to FIG. 4C). It is to be noted that since the second link mechanism 20B operates symmetrically to the first link mechanism 20A, the second chassis 12B also slides to a position that is most apart from the hinge device 16.

Based on the above, the one edge portions 12Aa and 12Ba of the chassis 12A and 12B are prevented from interfering with each other in the rotation from the 180-degree position to the 0-degree position, which allows a smooth rotation operation between the chassis 12A and 12B. That is, since the chassis 12A and 12B each slide in the direction that is apart from the hinge device 16 immediately after the start of rotation as illustrated in FIG. 4A to FIG. 4B, the one edge portions 12Aa and 12Ba of the chassis 12A and 12B are avoided from interfering with each other.

In particular, for the portable information device 10, the pin 30a of each of the link mechanisms 20A and 20B is at a position that is nearer to the cam part 32a than to the neutral part 32b at the boundary portion 32c of the shaft output portion 32 in the 180-degree position (refer to FIG. 6A). Then, this pin 30a serves as a driving source that slides the chassis 12A and 12B in the direction apart from the hinge device 16 in the rotation from the 180-degree position to the 0-degree position. Thus, immediately after the start of rotation between the chassis 12A and 12B, the pin 30a quickly slides on the cam part 32a without time lag or catch and can quickly slide the chassis 12A and 12B. As a result, although the portable information device 10 is configured such that the one edge portions 12Aa and 12Ba of the chassis 12A and 12B are in plane contact with each other as illustrated in FIG. 4A, mutual interference immediately after the start of rotation can be avoided.

In addition, left and right outer surfaces 30b of the pin 30a face the left and right side surfaces 32d of the groove part of the cam part 32a in the 180-degree position. Thus, the pin 30a smoothly slides on the cam part 32a at the start of operation from the 180-degree position to the 0-degree position. As a result, mutual interference between the chassis 12A and 12B immediately after the start of rotation can be further surely avoided.

Next, the operation when the portable information device 10 changes from the 180-degree position as illustrated in FIG. 4A to the 360-degree position as illustrated in FIG. 4D will be described. Also in this operation, the first link mechanism 20A (the second link mechanism 20B) rotates around the first hinge shaft 25a (the second hinge shaft 25b) with the first hinge base 16A (the second hinge base 16B). Thus, the pins 30a and 31a slide on the shaft output portions 32 and 33.

Specifically, as illustrated in FIG. 6A and FIG. 6C, the pin 30a of the slider 30 leaves the boundary portion 32c and slides on the neutral part 32b. On the other hand, the pin 31a of the slider 31 leaves the boundary portion 33c and slides on the cam part 33a at the same time. That is, the position of the slider 30 in the Y direction does not change as illustrated in FIG. 5C. The slider 31 moves to the right side in the drawing along the Y direction as illustrated in FIG. 5C.

As a result, in the first driving part 34A, the connecting shaft 37a moves in a direction that is apart from the connecting shaft 36a, as illustrated in FIG. 5C. Thus, the link member 37 rotates clockwise in the drawing on the rotation shaft 42. This moves the engagement pin 37b toward the first hinge shaft 25a in the X direction, and the output member 38 is pressed to be moved toward the first hinge shaft 25a in the X direction. At the same time, the link member 36 is rotated anticlockwise in the drawing on the rotation shaft 42 as a result of the engagement pin 36b being pressed by the output member 38.

As illustrated in FIG. 5C, the link members 36 and 37 therefore assume an intermediate position that is more contracted in the X direction than the position illustrated in FIG. 5A and more elongated than the position illustrated in FIG. 5B. Thus, the output member 38 moves to a position that is closer to some extent to the first hinge shaft 25a than the position illustrated in FIG. 5A in the X direction. That is, when the position changes from the 180-degree position to the 360-degree position, a direction of rotation of the first lever member 40A is the same, but an amount of rotation thereof is smaller compared to the operation when the position changes from the 180-degree position to the 0-degree position. As a result, the first chassis 12A slides to a position that is apart to some extent from the hinge device 16 (refer to FIG. 4D). At the same time, the second chassis 12B slides to a position that is apart to some extent from the hinge device 16.

Based on the above, also in this operation, the one edge portions 12Aa and 12Ba of the chassis 12A and 12B are prevented from interfering with each other immediately after the rotation from the 180-degree position to the 360-degree position, which allows a smooth rotation operation between the chassis 12A and 12B.

In particular, in the portable information device 10, the pin 31a of each of the link mechanisms 20A and 20B is at a position that is nearer to the cam part 33a than to the neutral part 33b at the boundary portion 33c of the shaft output portion 33 in the 180-degree position (refer to FIG. 6A). Then, this pin 31a serves as a driving source that slides the chassis 12A and 12B in the direction apart from the hinge device 16 in the rotation from the 180-degree position to the 360-degree position. Thus, also when the portable information device 10 changes from the 180-degree position to the 360-degree position, immediately after the start of rotation between the chassis 12A and 12B, the pin 31a quickly slides on the cam part 33a without time lag or catch and can quickly slide the chassis 12A and 12B.

In addition, left and right outer surfaces 31b of the pin 31a face the left and right side surfaces 33d of the groove part of the cam part 33a in the 180-degree position. Thus, the pin 31a smoothly slides on the cam part 33a at the start of operation from the 180-degree position to the 360-degree position. As a result, mutual interference between the chassis 12A and 12B immediately after the start of rotation can be further surely avoided.

It is to be noted that, as illustrated in FIG. 4A to FIG. 4D, a required slide distance of the chassis 12A and 12B is different between when the portable information device 10 of the present embodiment changes from the 180-degree position to the 0-degree position and when it changes from the 180-degree position to the 360-degree position. This is because the distance from the top surfaces 12Ac and 12Bc to the hinge shafts 25a and 25b is different from that from the bottom faces 12Ab and 12Bb thereto. Then, in the present embodiment, the Y-directional displacement amounts of the cam parts 32a and 33a of the shaft output portions 32 and 33 are made different. Therefore, if the slide distance of the chassis 12A and 12B may be the same, for example, the Y-directional displacement amounts of the cam parts 32a and 33a should be made the same. Of course the Y-directional displacement amount of the cam part 32a may be made smaller than that of the cam part 33a depending on the specification.

In addition, the rotational operation from the 0-degree position to the 180-degree position and that from the 360-degree position to the 180-degree position are opposite to the above-described operation, and the chassis 12A and 12B will gradually come close to each other.

As described above, since the portable information device 10 includes the link mechanisms 20A and 20B, both the chassis 12A and 12B slide in the direction apart from the hinge device 16 when the chassis 12A and 12B change from the 180-degree position to the 0-degree position and the 360-degree position. Thus, although the chassis 12A and 12B are configured to be arranged close to each other with little gap between them, mutual interference in the rotation can be prevented. As a result, it is possible to reduce the gap between the displays 14A and 14B of the portable information device 10 in the 180-degree position. That is, while in the portable information device 10, in particular, top end parts nearer to the top surfaces 12Ac and 12Bc, of the abutting end faces of the one edge portions 12Aa and 12Ba between the chassis 12A and 12B are made of right-angle corners, as described above (refer to FIG. 4A), the interference between both the end faces immediately after the position change operation can be prevented.

In this regard, the link mechanism 20A (20B) of the portable information device 10 each has the shaft output portions 32 and 33, and the driving part 34A (34B). Then, the shaft output portion 32 moves the slider 30 in the axial direction of the hinge shaft 25a (25b) in the change from the 180-degree position to the 0-degree position. On the other hand, the shaft output portion 32 does not move the slider 30 in the axial direction of the hinge shaft 25a (25b) in the change from the 180-degree position to the 360-degree position. In addition, the shaft output portion 33 does not move the slider 31 in the axial direction of the hinge shaft 25a (25b) in the change from the 180-degree position to the 0-degree position. On the other hand, the shaft output portion 33 moves the slider 31 in the axial direction of the hinge shaft 25a (25b) in the change from the 180-degree position to the 360-degree position. Then, the shaft output portions 32 and 33 each slide the chassis 12A (12B) through the driving part 34A (35A). In this way, the portable information device 10 selectively uses the shaft output portions 32 and 33 serving as a driving source between when it changes from the 180-degree position to the 0-degree position and when it changes from the 180-degree position to the 360-degree position. Thus, since specific shaft output portions 32 and 33 generate driving force in each change, it is possible to smoothly slide the chassis 12A (12B) immediately after the start of each operation.

It is to be noted that the present invention is not limited to the above-described embodiments, and needless to say, the present invention can be freely modified within a range that does not depart from the spirit of the present invention.

In the above, the configuration that includes a pair of the chassis 12A and 12B and a pair of the displays 14A and 14B has been described as an example, however, it may be a configuration that includes three or more chassis each mounted with a display. For example, in the case of three body chassis, it may be a hinged double door structure in which chassis are each connected to both sides of a central chassis using the hinge device 16.

In the above, the configuration that slides both the left and right chassis 12A and 12B at the same time has been described as an example. However, the portable information device 10 may be configured such that either one of the chassis 12A and 12B, for example, only the first chassis 12A slides and the second chassis 12B does not slide. In this case, the second link mechanism 20B on the second chassis 12B side should be omitted and the second chassis 12B should be integrally fixed to the second hinge base 16B etc.

In the above, the configuration in which the chassis 12A and 12B relatively slide with respect to the hinge bases 16A and 16B has been described as an example. However, the chassis 12A and 12B may be configured to include, for example, a base chassis that is fixed to the hinge bases 16A and 16B and a slide chassis that is relatively slidably supported with respect to the base chassis. In this case, the slide chassis serves as a top surface portion that supports the display.

In the above, the configuration in which the shaft output portions 32 and 33 are groove parts, and the pins 30a and 31a slide on the cam parts 32a and 33a that are in parts of the groove parts. However, the cam parts 32a and 33a (the neutral parts 32b and 33b) and the pins 30a and 31a may be composed of, for example, end faces of cylindrical bodies that are externally fitted to the outer peripheral surface of the hinge shaft 25a (25b) and slidably brought into contact with each other.

As has been described, the present invention provides a portable information device having chassis rotatably connected by a hinge.

While the invention has been particularly shown and described with reference to a preferred embodiment, it will be understood by those skilled in the art that various changes in form and detail may be made therein without departing from the spirit and scope of the invention.

What is claimed is:

1. A portable information device comprising:
    a first display provided on a top surface of a first chassis;
    a second display provided on a top surface of a second chassis;
    a hinge device to change said first and second chassis to a plate form in which said top surfaces are arranged side-by-side in an in-plane direction, a first stacked form in which said top surfaces are disposed to be overlapped to face each other, and a second stacked form in which bottom surfaces are disposed to be overlapped to face each other; and
    a link mechanism to operate in conjunction with rotational operations between said first and second chassis by said hinge device, wherein at least one of said first and second chassis is provided to be relatively slidable with respect to said hinge device along an arranging direction of said first and second chassis, wherein said link mechanism includes
        a first slider provided to be relatively movable with respect to a hinge shaft provided in said hinge device along an axial direction;
        a first shaft output portion moves said first slider along said axial direction of said hinge shaft, in response to a rotation of said hinge shaft when said first and second chassis are changed from said plate form to said first stacked form, while not to move said first slider in said axial direction of said hinge shaft when said first chassis and said second chassis are changed from said plate form to said second stacked form;
        a second slider provided to be relatively movable with respect to said hinge shaft along said axial direction and arranged side-by-side with said first slider in said axial direction of said hinge shaft;
        a second shaft output portion moves said second slider along said axial direction of said hinge shaft, in response to a rotation of said hinge shaft when said first chassis and said second chassis are changed from said plate form to said second stacked form, while not to move said second slider in said axial direction of said hinge shaft when said first chassis and said second chassis are changed from said plate form to said first stacked form; and
        a driving part relatively slides said first or second chassis in a direction apart from said hinge device when said first slider moves in said axial direction of said hinge shaft, and further to relatively slide said first chassis or said second chassis in said direction apart from said hinge device also when said second slider moves in said axial direction of said hinge shaft.

2. The portable information device of claim 1, wherein said first shaft output portion includes
    a first cam part extending along a circumferential direction of said hinge shaft to be inclined in said axial direction and on which said first slider slides; and
    a first neutral part provided continuously from said first cam part and extending along said circumferential direction of said hinge shaft and on which said first slider slides; and
said second shaft output portion includes
    a second cam part extending along said circumferential direction of said hinge shaft to be inclined in said axial direction and on which said second slider slides; and
    a second neutral part provided continuously from said second cam part and extending along said circumferential direction of said hinge shaft and on which said second slider slides.

3. The portable information device of claim 2, wherein said first slider includes a first pin, and said second slider includes a second pin.

4. The portable information device of claim 3, wherein said first cam part and said first neutral part are a groove part formed on an outer peripheral surface of said hinge shaft and into which said first pin is slidably inserted; and
said second cam part and said second neutral part are a groove part formed on said outer peripheral surface of said hinge shaft and into which said second pin is slidably inserted.

5. The portable information device of claim 3, wherein in said plate form
- said first pin is disposed at a position nearer to said first cam part than to said first neutral part at a boundary portion between said first cam part and said first neutral part; and
- said second pin is disposed at a position nearer to said second cam part than to said second neutral part at a boundary portion between said second cam part and said second neutral part.

6. The portable information device of claim 3, wherein
- said first pin includes outer surfaces substantially parallel to side surfaces forming a groove part of said first cam part, in a portion inserted into said groove part; and
- said second pin includes outer surfaces substantially parallel to side surfaces forming a groove part of said second cam part, in a portion inserted into said groove part.

7. The portable information device of claim 1, wherein said driving part includes
- a first link member having a first end connected to said first slider;
- a second link member having a first end connected to said second slider;
- an output member provided to be relatively movable with respect to said hinge device along said arranging direction and to which a second end of said first link member and a second end of said second link member are each connected; and
- a lever member having a first end and a second end, said lever member configured to rotate when said output member moves to relatively slide said first chassis or said second chassis with respect to said hinge device by rotatable support of a part between said first end and said second end with respect to said hinge device, connection of said first end to said output member, and connection of said second end to said first chassis or said second chassis.

8. The portable information device of claim 7, wherein
- said first link member and said second link member are disposed to intersect and positions between mutual first ends and second ends are connected by a rotation shaft; and
- said output member has a long hole into which said second end of said first link member and said second end of said second link member are inserted in a state of being slidable along said axial direction.

9. The portable information device of claim 1, comprising two of said link mechanisms, wherein
- said driving part of one of said link mechanisms relatively slides said first chassis or said second chassis in said direction apart from said hinge device when said first slider moves in said axial direction of said hinge shaft, and further relatively slides said first chassis or said second chassis in said direction apart from said hinge device also when said second slider moves in said axial direction of said hinge shaft; and
- said driving part of said other of said link mechanisms slides said second chassis in said direction apart from said hinge device when said first slider moves in said axial direction of said hinge shaft, and further slides said second chassis in said direction apart from said hinge device also when said second slider moves in said axial direction of said hinge shaft.

* * * * *